(12) United States Patent
Kuchoor

(10) Patent No.: US 10,389,774 B2
(45) Date of Patent: Aug. 20, 2019

(54) SYSTEM FOR BROADCASTING EVENTS

(71) Applicant: salesforce.com, inc., San Francisco, CA (US)

(72) Inventor: Santhosh Kumar Kuchoor, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 831 days.

(21) Appl. No.: 14/879,615

(22) Filed: Oct. 9, 2015

(65) Prior Publication Data

US 2017/0104798 A1   Apr. 13, 2017

(51) Int. Cl.
   *G06F 15/16* (2006.01)
   *H04L 29/06* (2006.01)
   *H04L 29/08* (2006.01)

(52) U.S. Cl.
   CPC ...... *H04L 65/4076* (2013.01); *H04L 65/1069* (2013.01); *H04L 67/141* (2013.01); *H04L 67/146* (2013.01)

(58) Field of Classification Search
   CPC . H04L 65/4076; H04L 67/141; H04L 67/146; H04L 65/1069
   USPC .................. 709/228, 248, 249, 250
   See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Moustafa M Meky
*Assistant Examiner* — Sahera Halim
(74) *Attorney, Agent, or Firm* — Lorenz & Kopf, LLP

(57) ABSTRACT

Systems and methods for broadcasting events are provided. The system, for example, may include, but is not limited to, a communication system, a memory, and a processor. The processor may be configured to receive, from the communication system, a session identifier identifying a broadcast session and at least one application event corresponding to the broadcast session from a presenting electronic device, update a playback queue corresponding to the broadcast session stored in the memory based upon the received at least one application event, receive, from the communication system, a subscription request to the broadcast session from at least one subscribing electronic device, and transmit, via the communication system, a corresponding playback queue to each electronic device subscribed to the broadcast session, the playback queue including instructions to regenerate the application event within an application operating on the at least one subscribing electronic device.

7 Claims, 2 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,862,762 B1 * | 10/2014 | Motrenko ............ H04L 51/10 709/230 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0182833 A1 * | 7/2009 | Balasubramanian ....................... G06Q 10/107 709/208 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

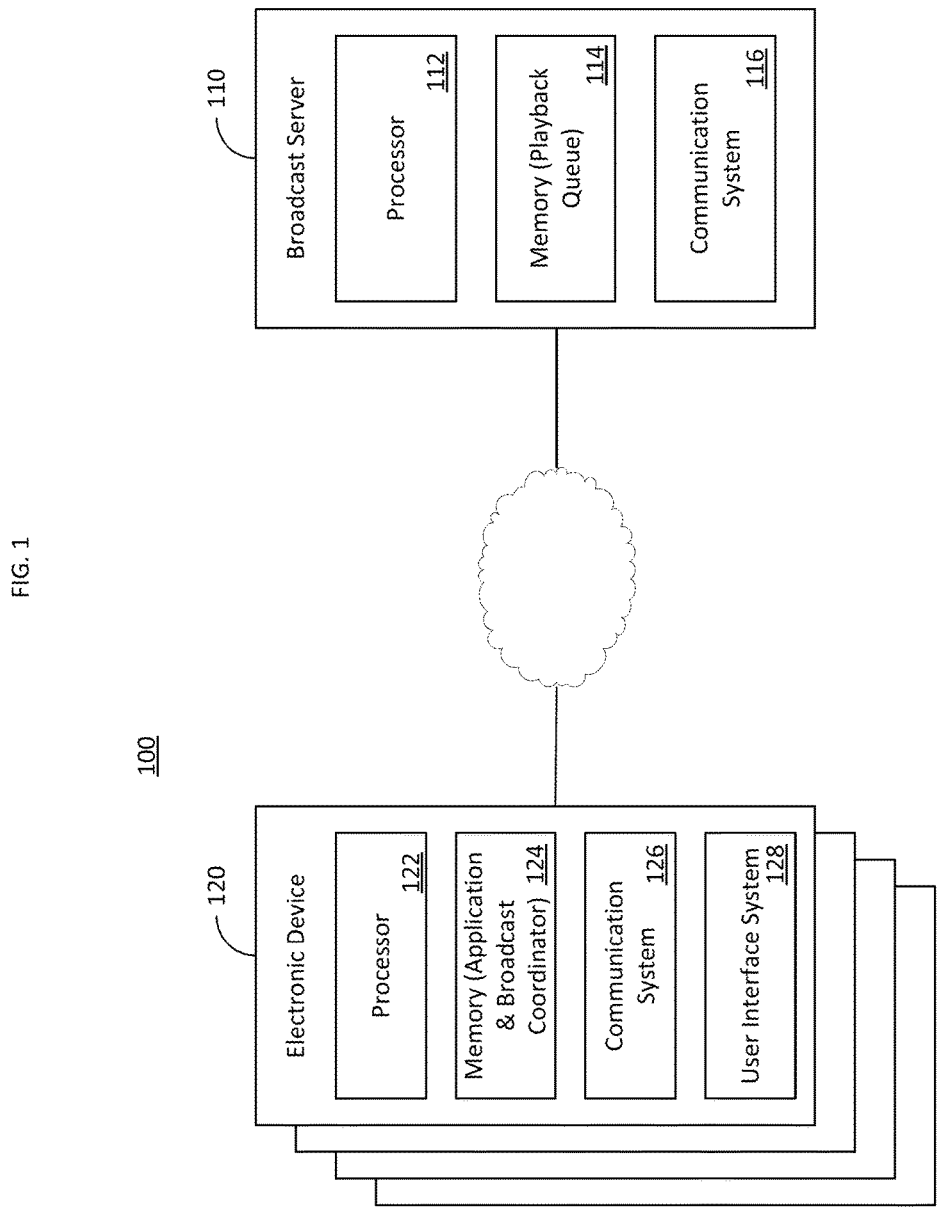

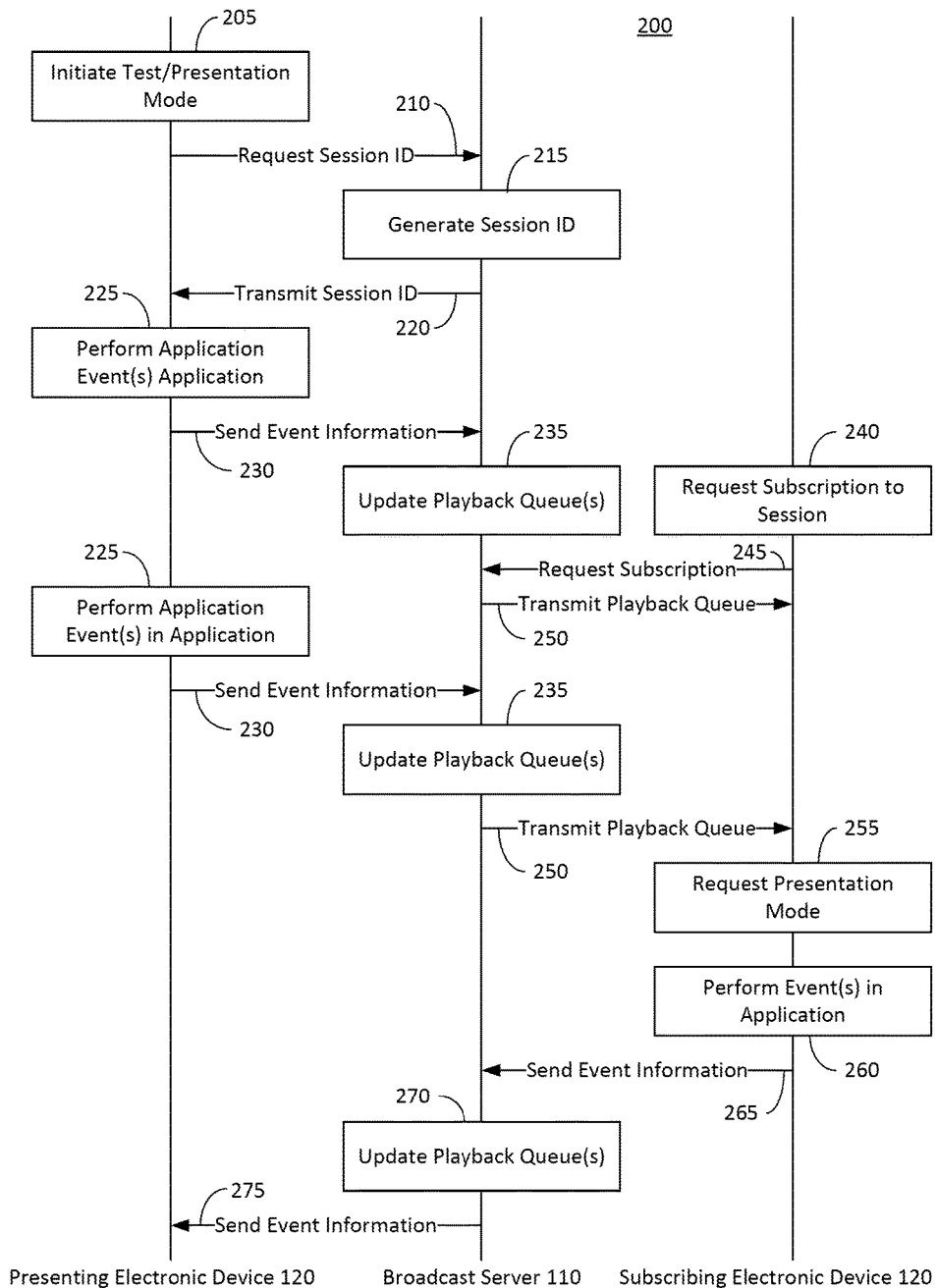

SYSTEM FOR BROADCASTING EVENTS

TECHNICAL FIELD

The present disclosure generally relates to broadcasting systems, and more particularly relates to server based broadcasting systems.

BACKGROUND

Software application demonstrations are often made using video of the application in operation or screenshots of the application in operation. In other instances, web browsers may be utilized in a co-browsing configuration such that everyone viewing the web page has an identical screen in order to make a presentation.

BRIEF DESCRIPTION OF THE DRAWINGS

The detailed description will hereinafter be described in conjunction with the following drawing figures, wherein like numerals denote like elements, and wherein:

FIG. 1 is a block diagram of an exemplary system for broadcasting events, in accordance with an embodiment;

FIG. 2 is a flow chart illustrating an exemplary method for operating the system for broadcasting events, in accordance with an embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, or the following detailed description.

In accordance with one embodiment, a broadcasting system is provided. As discussed in further detail below, the broadcasting systems allows users to either test an application over multiple devices or make a presentation (i.e., a demonstration) of the application from within the application over multiple devices.

FIG. 1 is a block diagram of an exemplary system for broadcasting events 100, in accordance with an embodiment. The system includes at least one broadcast server 110 and any number of electronic devices 120. As discussed in further detail below, the broadcast server 110 enables an event within an application to be broadcast to native applications within the electronic devices 120. In one embodiment, for example, the event may be a demonstration of the application or a test of the application. However, the system for broadcasting events could be used in any type of event or in any situation where mirroring events in an application is desirable. Because the events are broadcast into native applications running on the electronic devices 120, rather than in a web browser (e.g., co-browsing) or being presented via presentation software (e.g., PowerPoint or the like), subscribers to the event can still manipulate the application running on their respective electronic device 120 while the application running on their electronic device 120 is simultaneously, or at least substantially contemporaneously, manipulated by one or more presenters on another electronic device 120.

In one embodiment, for example, the broadcast server 110 may be implemented utilizing a server at a location remote from the electronic devices 120. However, in another embodiment, the broadcast server 110 may be implemented using a laptop computer, a cellular phone, a tablet computer, a desktop computer, or the like. In these embodiments, for example, the broadcast server 110 may be in the same room as the electronic devices 120 subscribed to the broadcast session or may be located in any remote location.

The broadcast server 110 includes a processor 112. The processor 112 may be a central processing unit (CPU), a graphics processing unit (GPU), an application specific integrated circuit (ASIC), a field programmable gate array (FPGA), a microcontroller, or any other logic device or combination thereof. The broadcast server 110 further includes a memory 114. The memory 114 may be any combination of volatile and non-volatile memory. The memory 114 may store non-transitory computer readable instructions, which when executed by the processor 112, implement aspects of the system for broadcasting events 100, as discussed in further detail below.

The memory 114 may also store a playback queue. The playback queue, as discussed in further detail below, tracks application events captured from a presenting electronic device 120 in such a manner that the captured application events can be recreated within applications running within other electronic devices 120.

The broadcast server 110 further includes at least one communication system 116. The communication system(s) 116 may be any wired or wireless communication system, including, but not limited to, a Ethernet communication system, a WIFI communication system, a cellular communication system, a satellite communication system, a Bluetooth communication system, a ZigBee communication system, or the like.

The electronic devices 120 may be implemented in a variety of forms, including, but not limited to, cellular phones, laptop computers, desktop computers, tablets, wearable devices (glasses, watches, etc.), and the like.

Each electronic device 120 includes a processor 122. The processor 122 may be a central processing unit (CPU), a graphics processing unit (GPU), an application specific integrated circuit (ASIC), a field programmable gate array (FPGA), a microcontroller, or any other logic device or combination thereof. The broadcast server 110 further includes a memory 124. The memory 124 may be any combination of volatile and non-volatile memory.

The memory 124 may also store an application executable by the processor 122. The application may be any program executable in any one or more operating systems. The application may be programmed to be native to one or more of IOS, Android, Windows, MAC OS X, Linux, Unix, Ubuntu, or the like. In other words, there could be many versions of the same application each configured to operate on a different operating system, devices and/or using different types of processors. For example, an application written for the IOS platform may be written in the Swift programming language, an application written for the Android operating system may be written in the Java programming language, and an application written for a Windows operating system could be written in C++, C#, Microsoft Visual Basic or Java. Furthermore, electronic devices 120, which may share an operating system, may require different instructions to perform an identical event. For example, multiple phone manufacturers may utilize different screen sizes, different screen orientations, different hardware buttons, different software buttons, or any other different user interfaces which could affect the operation of the application operating on the electronic device. Because applications are made available over a wide variety of platforms, testing applications to ensure the applications behave in a similar manner can be difficult.

The memory 124 may store non-transitory computer readable instructions, which when executed by the processor 122, implement a broadcast coordinator, as discussed in further detail below. In one embodiment, for example, the broadcast coordinator may be built into the application to coordinate the events of the application with the broadcast server 110. However, in another embodiment, for example, the broadcast coordinator may be a separate application which captures events within an application and coordinates with the broadcast server 110 to implement the system 100.

The electronic device 120 further includes at least one communication system 126. The communication system(s) 116 may be any wired or wireless communication system, including, but not limited to, an Ethernet communication system, a WIFI communication system, a cellular communication system, a satellite communication system, a Bluetooth communication system, a ZigBee communication system, or the like.

The electronic device further includes at least one user interface system 128. The user interface system(s) 128 may include one or more of a mouse, a keyboard (virtual or hardware based), a display, a touchscreen display, a trackball, a trackpad, or the like. As discussed in further detail below, a user of the electronic device may utilize one or more user interface systems 128 to cause application events in an application operating on the electronic device 120.

FIG. 2 is a flow chart illustrating an exemplary method 200 for operating the system for broadcasting events 100. As discussed above, the system for broadcasting events 100 may be operated in a test mode or a presentation mode. The test mode allows a user to test the application on multiple electronic devices 120. The test mode may be utilized, for example, to test that an application behaves consistently across versions programmed for different devices. The test mode could also be used to test or practice for a demonstration of the application. The presentation mode allows a user to demonstrate an application within the application operating on any number of different electronic devices.

The method 200 begins when a user requests initiation of a broadcast session in either the test mode or the presentation mode on an electronic device 120. (Step 205). The mode can be requested in a variety of ways. As discussed above, a broadcast coordinator may be built into the application. Accordingly, in these embodiments a user may initiate one of the modes by interfacing with a virtual button in the application, a drop-down menu item, a dedicated hardware button on the electronic device 120, or the like. When the broadcast coordinator is a separate application on the electronic device, the desired mode may be initiated in a similar fashion within the separate application.

In one embodiment, for example, upon receipt of the request to initiate the one of the respective modes, the processor 122 of the electronic device 120 may request a session identifier from the broadcast server 110 via the communication system 126. (Step 210). The request for a session identifier may establish a test session or a presentation session with the broadcast server 110 which may track the respective sessions based upon the session identifier. The broadcast server 110 may coordinate multiple test sessions and/or presentations sessions simultaneously and tracks each of the sessions via an assigned session identifier. The request for a session identifier may be sent with a client identifier associated with the electronic device 120 and/or a user identifier associated with the user which may be used to track the session, as discussed in further detail below. In one embodiment, for example, a user may also submit a password for the test session or the presentation session. As discussed in further detail below, the broadcast server 110 may require the password in order for another electronic device to subscribe to the test session or presentation session.

The processor 112 of the broadcast server 110, upon receipt of the request, may generate the session identifier (Step 215) and transmit the session identifier to the respective electronic device 120 via the respective communication systems 116 and 126. (Step 220). The session identifiers may be generated sequentially, randomly, may be based upon, or may be, a client identifier associated with the electronic device 120 requesting the session or the user identifier associated with the user of the electronic device 120, or the like. In another embodiment, for example, the user initiating the session may request a specific session identifier which may be transmitted to the broadcast server 110 along with the request to initiate the session in Step 205 and 210.

The user of the electronic device 120 may then perform one or more application events within the application running on the electronic device 120. (Step 225). The application event(s) may be any occurrence of an event within an application and can vary widely depending upon the application. As an example, if the application is a customer relationship management software application, such as Sales Cloud, the application event may include adding a new contact, updating an existing contact, navigating various menus or the like. If the application is a video game, the application event may be making one or more moves in the game. If the application is a photography editing application, the application event could include utilizing one or more tools within the application to edit a photo. The application event could also include any input instructions within the application, such as moue movements, touch locations, keyboard entries or the like.

In one embodiment, for example, each application event may be captured by the broadcast coordinator of the electronic device 120 in terms of one or more function performed. In other words, each time the processor performs a function for the application, the broadcast coordinator captures the function as part of an application event. The functions can vary widely depending upon the application. However, as an example, if the application were a customer relationship management software application, and a user utilized a combination of keyboard keys to quick select to create a new account or used a mouse or their finger to select a create new account interface, the broadcast coordinator would capture the function of creating a new account rather than the specific keyboard keys or other input methods used to initiate the event. In another embodiment, for example, the broadcast coordinator may capture user interface inputs, such as touchscreen touches, mouse movements and clicks, keyboard inputs or the like. These user interface inputs may then be used to recreate the application event on other electronic devices, as described in further detail below. In other embodiments, for examples, both user interface inputs and functions may be captured as application events to be recreated in the test session or the presentation session.

The processor 122 of the electronic device 120 then sends the captured application event(s) to the broadcast server 110 via their respective communication systems 116 and 126. (Step 230). In one embodiment, for example, the user of the electronic device 120 may be able to control when events are transmitted to the broadcast server 110. The broadcast coordinator, for example, may be configured by a user to either transmit events performed in the application immediately or to store events in a queue. The events in the queue may be transmitted all at once or may be released to the broadcast server 110 in any number. By enabling the user to queue events, the user can plan the events for the broadcast and release the events at a desired time. In one embodiment, for example, the queue may be modifiable by the user. In other words, a user may be able to remove events from the queue, change an order of events, or the like, in order to plan the desired broadcast.

While FIG. 2 only illustrates two instances of event information being sent to the broadcast server 110, the electronic device may send any number of events any number of times and at any time after the session is initiated.

Each time the broadcast server 110 receives an event from the electronic device, the processor 112 of the broadcast server 110 updates a playback queue associated with the session identifier. (Step 235). The playback queue is an ordered list of events performed in the application on the electronic device 120 that the user wishes to broadcast to subscribed electronic devices 120. In one embodiment, for example, the processor 112 of the broadcast 110 server may identify one or more instructions for each event such that electronic devices 120 subscribed to a channel associated with the session identifier can recreate the event. As discussed above, the application may be written in a variety of programming languages to operate on a variety of different types of devices and operating systems. As such, when events are captured functionally an event performed on a first electronic device 120, for example an IOS device, may require different instructions to be functionally performed in an application on a second electronic device 120, such as an Android based device. In one embodiment, for example, the memory 114 of the broadcast server may store a lookup table. The lookup table may identify every event that may be performed in the application and one or more corresponding instructions to execute the event in each version of the application. Accordingly, in this embodiment, the playback queue may store the one or more instructions for each application. When events are captured based upon input, such as keys pressed, touch location, mouse input or the like, the lookup table may be utilized to determine corresponding input on each subscribed device. For example, different versions (OS versions) of the application may have specific functional inputs at different locations on an output screen. Different devices, even when utilizing the same operating system, may also have different input locations due to different screen sizes or orientations. Accordingly, when input locations are tracked as events, the lookup table may store equations for translating the input for different devices In another embodiment, for example, each event performed by the user in the application may correspond to an event identifier in a lookup table. The event identifier may be a code corresponding to the event. In this embodiment, for example, the processor 112 of the broadcast server 110, upon receipt of one or more events from an electronic device in Step 230, may generate a playback queue including the event identifier(s) corresponding to the one or more events performed in the application. Once the playback queue is transmitted to subscribed electronic device(s) 120, as discussed in further detail below, the processor 122 of the electronic device 120 may determine corresponding instruction(s) to perform the events by determining the one or more instructions corresponding to the event identifier.

While the flow chart illustrates only two instances for updating the playback queue in Step 235, the processor 112 of the broadcast server 110 may update the playback queue each time a new event is received in Step 230.

Once a session has been established by the broadcast server 110, other user(s) can subscribe to the session on other electronic devices, hereinafter referred to as subscribing electronic devices. (Step 240). In one embodiment, for example, in order to subscribe to the test session on another electronic device 120, the user of the presenting electronic device 120 (illustrated on the left side of FIG. 2) may merely have to log into the application on any subscribing electronic device 120 (illustrated on the right side of FIG. 2) using the same user identifier used to login to the application on the presenting electronic device. In other words, upon logging into the application, the broadcast coordinator of an subscribing electronic device 120 may transmit the user identifier to the broadcast server 110, as discussed in further detail below.

In another embodiment, for example, when subscribing to a test session or a presentation session in Step 240, a user of a secondary electronic device 120 may manually enter in the session identifier in a user interface in the application operating on the secondary electronic device 120. In another embodiment, for example, the user could select the desired subscription from a list of available subscriptions on the broadcast server 120. While not illustrated in FIG. 2, the broadcast coordinator 110 may transmit a list of available presentation sessions and/or test sessions to the subscribing electronic devices. When the session is password protected, limiting the availability to subscribe the session, the user may also have to enter in the password for the session to gain access to the session.

While Step 240 is illustrated as occurring around the same time as the playback queue is updated in FIG. 2, a user of the secondary electronic device 120 could attempt to subscribe to the session at any time after the session is established by the broadcast server 110 in Step 215.

Upon receipt of the user identifier or the session identifier, the processor 122 of the second electronic device 120 transmits a subscription request to the broadcast server 110 via the respective communication systems 116 and 126. (Step 245). The subscription request may include one or more of an address corresponding to the second electronic device 120, a version identifier identifying a version of the application, an operating system identifier corresponding to the second electronic device 120, a device identifier corresponding to the second electronic device 120, or the like. The processor 112 of the broadcast server 116 may then transmit the event instructions or event identifier to the subscribed electronic devices 120 based upon their reported addresses. As discussed above, different electronic devices may require different instructions in order to recreate the application events within the application operating on a respective electronic device. Accordingly, the broadcast server 110 may transmit customized instructions for each subscribing electronic device 120 based upon the device identifier identifying the device, the version identifier identifying the version of the application operating on the respective electronic device or any of the other identifying information transmitted in the subscription request.

The processor 112 of the broadcast server 110 then transmits the playback queue to each of the subscribed electronic devices. (Step 250). As discussed above, the playback queue may include event instruction(s) or event identifier(s) to alter a state of the application on the subscribed electronic devices 120. In one embodiment, for example, if one or more events have already been placed into the playback queue before the subscription request is received, the processor 112 of the broadcast server 110 may transmit all of the events in the playback queue to the subscribed electronic devices 120. In this embodiment, for example, a user of the subscribed electronic device 120 may have the option to immediately go to a most recent state (i.e., a state of the application after all of the received events have been performed) or to view each of the events one step at a time. The processor 122 of the electronic device 120 may be configured to create a user interface to step through the events and a user interface to accept all of the events.

While the playback queue is only illustrated as being transmitted to the subscribing electronic device 120 twice, the playback queue may be transmitted to a subscribed electronic device 120 any number of times, depending upon when during the session the electronic device subscribed to the session and how many times the user of the presenting electronic device 120 updates the application.

In one embodiment, for example, a user of the subscribing electronic device 120 may be able to update the playback queue. During a test session or a presentation session a user of a subscribing electronic device 120 may be able to request permission to upload application events to the broadcast server. (Step 255). In one embodiment, for example, in test sessions any action performed in the subscribing electronic device 120 may be interpreted by the processor 122 of the subscribing electronic device 120 to be a request to update the playback queue. In another embodiment, for example, the processor 122 of the subscribing electronic device 120 may also generate a user interface to specifically request permission for the subscribing electronic device 120 to be enabled to update the playback queue. While not illustrated in FIG. 2, the subscribing electronic device 120 may submit the request to the broadcast server 110, which may in turn submit the request to the presenting electronic device 120 for approval. In yet another embodiment, for example, a user of the presenting electronic device 120 may be able to submit settings for the broadcast session in the request to initiate the session in Step 205 or in any subsequent communication, such as when the event information is submitted to the broadcast server in Step 225. A user may select, for example, whether all other subscribing devices have the ability to update the playback queue, only a subset of the subscribing devices or none. Furthermore, the user of the presentation electronic device 120 may update the settings at any time. In other words, a setting change in the application operating on the presenting electronic device 120 is an event application that will update settings on the application operating on the subscribing electronic devices 120 via the broadcast server 110.

A user of the subscribing electronic device 120 may the manipulate the application operating on their respective device (Step 260) which then causes the processor 122 of the subscribing electronic device to transmit the captured application event(s) to the broadcast server 110 via their respective communication systems 116 and 126. (Step 265). The processor 112 of the broadcast server 110 updates the playback queue in a similar manner as discussed above (Step 270) and transmits the updated playback queue to all of the subscribing devices (275). In the example illustrated in FIG. 2, the broadcast server 110 is only illustrated as transmitting the updated playback queue to the presenting electronic device 120 (as there are only two electronic devices 120 illustrated in FIG. 2), however, the broadcast server 110 would broadcast the playback queue to every other electronic device 120 subscribed to the broadcast session which did not originate the application event. Accordingly, in this embodiment, a user in a test mode can originate the application events on any electronic device subscribed to the test session and user's subscribed to a presentation session could all manipulate the applications operating on their respective electronic devices 120 and share the results making any presentation of the application interactive.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for broadcasting events, comprising:
a communication system;
a memory; and
a processor communicatively connected to the communication system and the memory, the processor configured to:
receive, from the communication system, a session identifier identifying a broadcast session and at least one application event corresponding to the broadcast session from a presenting electronic device;
update a playback queue corresponding to the broadcast session stored in the memory, the playback queue comprising the at least one application event;
receive, from the communication system, a subscription request to the broadcast session from at least one subscribing electronic device, each subscription request including an application identifier identifying a version of an application operating on the respective subscribing electronic device and a device identifier associated with the subscribing electronic device;
modify the playback queue for each version of the application and for each subscribing electronic device, the modifying comprising converting the at least one application event based upon a lookup table storing corresponding each application event with each version of the application and each device identifier; and
transmit, via the communication system, a corresponding modified playback queue to each electronic device subscribed to the broadcast session, the modified playback queue including instructions to regenerate the application event within the version of the application operating on the at least one subscribing electronic device.

2. The system according to claim 1, wherein the processor is further configured to:
receive, via the communication system from the presenting electronic device, a request to initiate the broadcast session;

generating the session identifier identifying the broadcast; and transmitting, via the communication system, the session identifier to the presenting electronic device.

3. The system according to claim 2, wherein the broadcast session is a presentation session.

4. The system according to claim 2, wherein the broadcast session is a test session.

5. The system according to claim 1, wherein processor, when updating the playback queue, is further configured to:
determine at least one event identifier corresponding to the application event, the event identifier comprising a code corresponding to the application event; and
storing the at least one event identifier in the playback queue.

6. The system according to claim 1, wherein the at least one subscribing electronic device includes at least one electronic device operating an application in a first operating system and at least one electronic device operating the application in a second operating system, and the processor, when updating the playback queue, is further configured to:
determine, for each of the at least one subscribing electronic devices to the broadcast session, at least one instruction for recreating the application event based upon the operating system of each of the at least one subscribing electronic devices; and
storing the at least one instructions in the playback queue.

7. The system according to claim 1, wherein the processor is further configured to:
receive, via the communication system from a subscribing electronic device, an application event; and
update the playback queue corresponding to the broadcast session stored in the memory based upon the received application event.

* * * * *